United States Patent [19]

Yamamoto

[11] Patent Number: 4,998,602
[45] Date of Patent: Mar. 12, 1991

[54] DRUM BRAKE SHOE HOLD-DOWN AND RETRACTION SPRING AND ANCHOR POST THEREFOR

[75] Inventor: Mayjue A. Yamamoto, Livonia, Mich.

[73] Assignee: General Motors Corporation, Detroit, Mich.

[21] Appl. No.: 412,302

[22] Filed: Sep. 25, 1989

[51] Int. Cl.$^5$ ............... F16D 65/09; F16D 71/00
[52] U.S. Cl. ............................ 188/328; 188/216; 188/340
[58] Field of Search ............ 188/206 A, 216, 328, 188/335, 340, 341

[56] References Cited
U.S. PATENT DOCUMENTS 4,088,311  5/1978  Rupprecht ............... 188/216 X
4,762,209  8/1988  Copp ............................ 188/328

Primary Examiner—Duane A. Reger
Attorney, Agent, or Firm—Ernest E. Helms

[57] ABSTRACT

A single generally U-shaped wire spring has a plurality of torsional spring loops formed in the center and fitting over an anchor mounting post for a leading-trailing shoe assembly. Each arm of the spring extends along the web of a shoe and terminates in a hook end which fits within a slot in the associated shoe web. The spring will return the brake shoes to their retracted position after service or parking brake operation, reengaging the adjuster/strut assembly after actuation of the wheel cylinder during service brake operation; retain the lower ends of the shoes against the anchor plate; and hold the shoes against the backing plate by the cantilever spring force component of the spring acting against retaining lips formed as part of the anchor mounting post, resulting in a cantilever spring load directed onto the web of each shoe toward the backing plate.

2 Claims, 1 Drawing Sheet

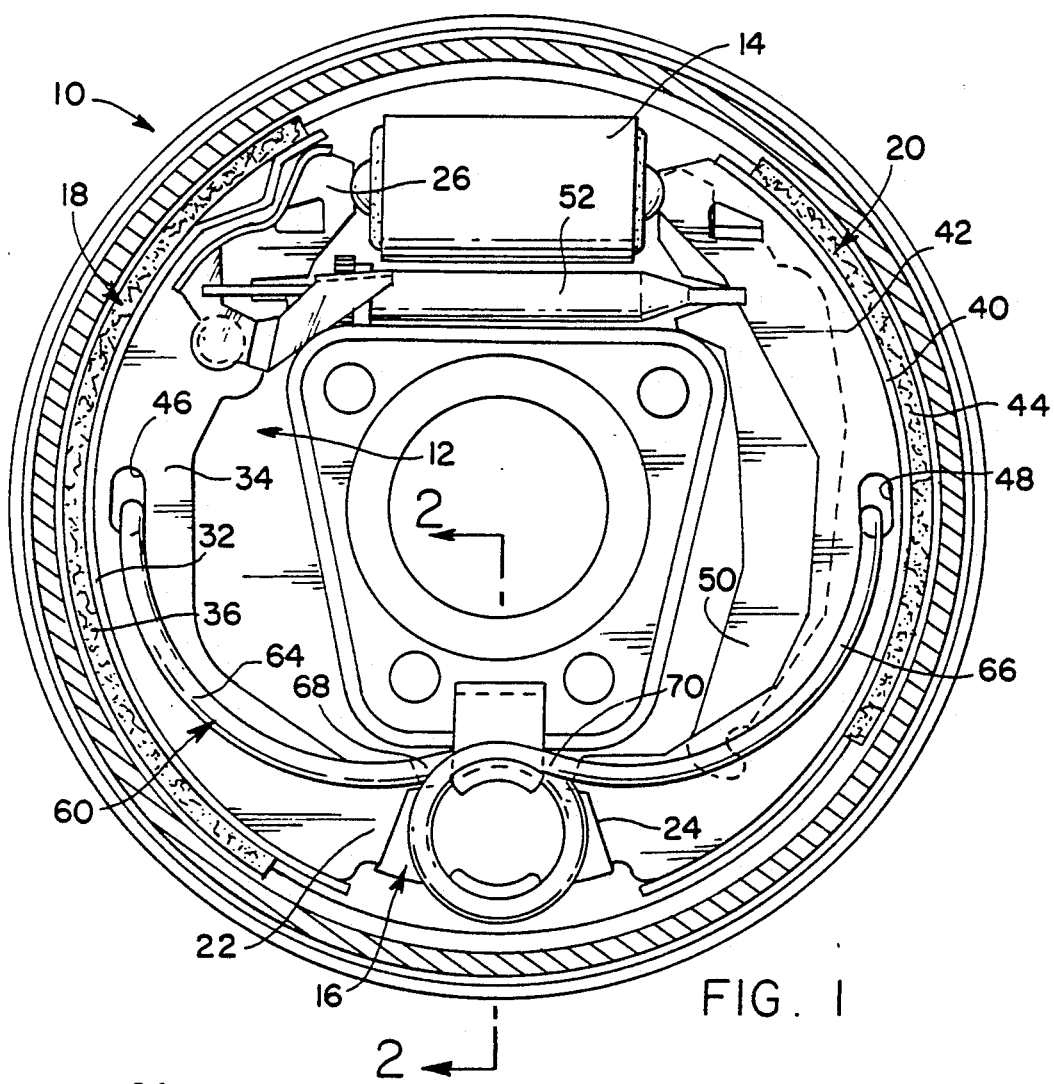
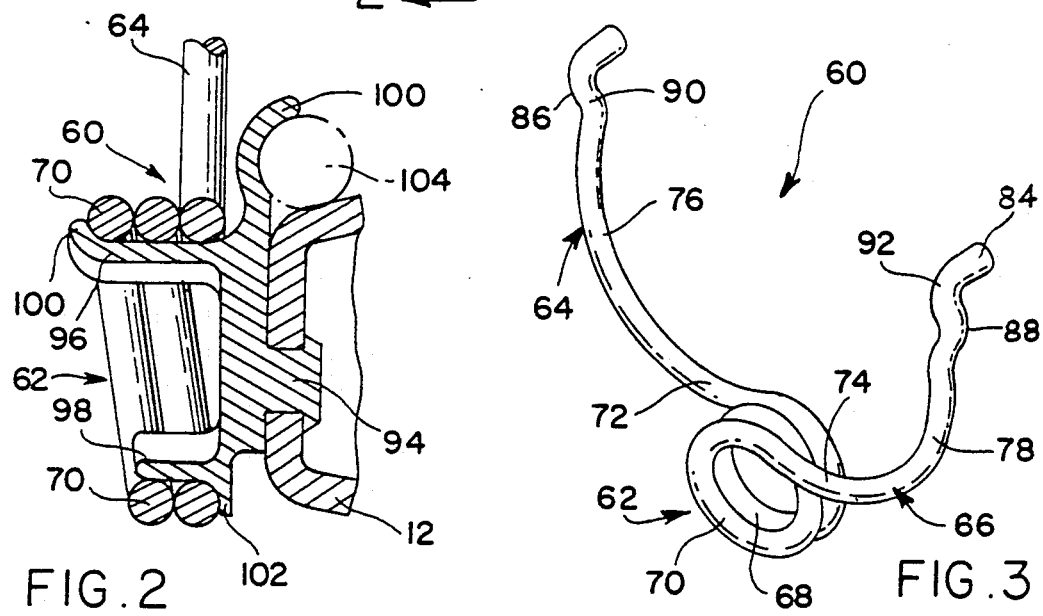
FIG. 1
FIG. 2
FIG. 3

DRUM BRAKE SHOE HOLD-DOWN AND RETRACTION SPRING AND ANCHOR POST THEREFOR

FIELD OF THE INVENTION

The invention relates to a drum brake assembly of the lead-trailing shoe type in which a single piece spring installed as a part of the assembly holds down the brake shoe assemblies against the backing plate and also retracts the shoes after brake actuation. The single piece spring also retains the lower ends of the shoes against the anchor plate.

DESCRIPTION OF RELATED ART

The invention is a modification of the single piece spring and its anchor mount shown in U.S. Pat. No. 4,762,209, issued Aug. 9, 1988, entitled, "Drum Brake Assembly and Shoe Hold-Down and Retraction Spring Therefor" and assigned to the common assigned. That disclosure employed a single partial loop center section and a different mounting arrangement for that section.

SUMMARY OF THE INVENTION

The anchor includes a post which holds the torsional coils or loops of a brake shoe retraction and hold-down spring, the spring being made in one piece and being generally U-shaped to connect with both brake shoes. The spring exerts torsionally loaded spring forces on the brake shoes for brake shoe retraction and cantilever spring forces on the brake shoes for shoe hold-down. The torsional multi-loop arrangement provides additional resiliency to the spring in its brake shoe retraction function. It also permits the use of a modified anchor which allows a tilted push-on assembly of the spring.

BRIEF DESCRIPTION OF THE DRAWING

FIG. 1 is a side elevation view of a drum brake assembly embodying the invention.

FIG. 2 is a fragmentary cross-section view taken in the direction of arrows 2—2 of FIG. 1 and illustrating the anchor in its relation to the torsional portion of the spring.

FIG. 3 is a perspective view of the single piece spring of the invention.

The drum brake assembly 10 includes a backing plate 12 having mounted thereon a wheel cylinder 14 and an anchor 16 circumferentially opposite the wheel cylinder. A pair of brake shoe assemblies 18 and 20 are also mounted on the backing plate. The shoe assemblies respectively have adjacent ends 22 and 24 engaging the anchor 16 and another set of adjacent ends 26 and 28 engaging the wheel cylinder for actuation. Shoe assembly 18 is formed by shoe rim 32 and shoe web 34, with the brake lining 36 mounted on the shoe rim. Shoe assembly 20 is formed by rim 40 and web 42, with the brake lining 44 mounted on rim 40. Shoe web 34 has a slot 46 formed therethrough adjacent to the rim 32 and positioned substantially mid-way between or somewhat nearer the wheel cylinder 14 than the anchor 16. Similarly, shoe web 42 has a slot 48 formed therein and similarly positioned. The particular drum brake assembly 10 illustrated is one which also has an arrangement for mechanical actuation for parking brake purposes. Therefore the parking brake arm 50 is mounted on web 42 of shoe assembly 20 so as to be actuated as is well known in the art. For this purpose the spreader/adjuster strut 52 is connected with webs 34 and 42 of shoe assemblies 18 and 20 and is engageable by arm 50 for such actuation. A suitable adjuster actuating mechanism 54 is also provided as a part of the shoe assembly 18 and the spreader/adjuster strut 52.

The spring 60 is a U-shaped brake shoe return and hold-down spring which when installed provides all of the functions of shoe hold-down springs and shoe retracting springs. Spring 60 has a center loop section 62 with a first spring arm 64 and a second spring arm 66 extending from the center loop section. The center loop section is formed by a plurality of torsion spring loops, with two such complete loops 68 and 70 being illustrated. The loops 68 and 70 respectively connect with spring arms 64 and 66 at bends 72 and 74 so that the spring arms extend laterally outward in generally arcuate opposed directions from the center loop section 62 and are also curved toward the backing plate in the spring arm intermediate portions 76 and 78. The loops 68 and 70 are mounted on the anchor 16 as described below.

Spring arms 64 and 66 respectively terminate with hooked ends 82 and 84. Spring arms 64 and 66 are also preferably provided with double bends 86 and 88 which offset the outer portions 90 and 92 of the arms 64 and 66 from their intermediate portions 76 and 78, as is better seen in FIG. 3, so that the spring arm portions 90 and 92 are in engagement with the outer sides of their respectively associated shoe webs 34 and 42 after assembly, as seen in FIG. 1, and exert shoe hold-down forces thereon. The hooked ends 82 and 84, extending through the web slots 46 and 48, also exert shoe retraction forces on the brake shoes.

Anchor 16 is suitably secured to the backing plate 12 by integral rivet 94, for example, and has a spring mounting and retaining post formed by upper and lower tab-like portions 96 and 98 extending outwardly therefrom perpendicularly to the backing plate 12. These portions are arcuately formed as circumferentially extending segments, as is better seen in FIG. 1 so as to conform to the curvature of the internal diameter of the torsional spring loops of center loop section 62. The outer end of portion 96 is provided with a retaining lip 100, and the inner end of portion 98 is provided with a retaining lip 102. Both lips extend outward generally parallel to the backing plate 12. The torsional spring loops 68 and 70 fit over the tab-like portions 96 and 98, with lips 100 and 102 holding them in place and providing the reaction areas for the spring 60 as it exerts hold-down forces on the shoe webs 34 and 42.

The anchor 16 has another tab-like portion 104 extending upwardly and cupped so that it functions as a parking brake actuating cable assembly support and guide. The parking brake actuating cable assembly 106 is illustrated in phantom Anchor 16 is also provided with slotted laterally extending flanges 108 and 110 which respectively receive the adjacent ends 22 and 24 of the brake shoe assemblies 18 and 20.

The drum brake is assembled by placing the shoe assemblies 18 and 20 in position so that their ends engage the wheel cylinder 14 and the anchor 16 as shown, with strut 52 and adjuster mechanism in place. The spring 60 is then placed in position by pushing the center loop section 62 over the upper anchor tab section 96 as shown and moving the spring loops 72 and 74 on anchor tab section 98 to seat the center loop section 62 on the anchor The spring hooked ends 82 and 84 are inserted into the slots 46 and 48, preferably after the center loop section 62 is installed on the anchor 16. The assembled position of the spring 60, because of the retention of the center loop section 62 by lips 100 and 102 and the curvature of the spring arm intermediate portions, causes spring forces to be exerted on the shoes toward the backing plate with the center loop section 62 exerting a spring reaction force on the anchor 16. The spring arms 64 and 66 had to be spread apart to some extent in order to insert their hooked ends in the shoe web slots 46 and 48, torsionally loading the spring. Therefore the spring arms also exert forces urging the shoe assemblies 18 and 20 toward the retracted position shown. These forces are the result of the torsional loading of the spring loops 68 and 70 as well as the lateral cantilever loading of the spring arms 64 and 66. Due to the particular arrangement of the center loop section 62 of the spring, as well as the various bends and curvatures of the spring arms 64 and 66, the spring is also cantilever spring loaded in the direction of the backing plate with spring reaction being taken by the anchor mounting post lips 100 and 102, so that it also exerts a cantilever spring force on each shoe assembly continually urging that shoe assembly toward the backing plate 12 as above noted. Thus the spring performs the function of hold-down springs which have been commonly provided for each shoe assembly, as well as retraction springs which in a leading/trailing brake shoe assembly are normally provided adjacent to the upper shoe ends 26 and 28 and also the lower shoe ends 22 and 24. The slots 46 and 48 are so located in the shoe webs, and the spring arms 64 and 66 are of such a length, that the retraction force of the spring is exerted on the shoes to continually urge the shoe ends into engagement with the wheel cylinder and the anchor Furthermore, the positioning of the portions of the spring arms 64 and 66 adjacent their bends 72 and 74 provide some security against the shoe ends 22 and 24 being removed laterally from the anchor at any time. This action is further enforced by the engagement of the spring arm portions 90 and 92 with the outer sides of the shoe webs 34 and 42.

The provision of the torsional spring loops 68 and 70 provide additional resilience in the shoe retraction mode as compared to the earlier construction illustrated in the above noted patent application. The spring is quickly removed and replaced at any time that the shoes are required to be removed and replaced.

The embodiments of the invention in which an exclusive property or privilege is claimed are defined as follows:

1. A drum brake assembly comprising:
a backing plate having mounted thereon a wheel cylinder and an anchor circumferentially opposite said wheel cylinder, a pair of brake shoe assemblies having a first set of adjacent ends engaging said anchor and a second set of adjacent ends engaging said wheel cylinder for actuation, each of said brake shoe assemblies including a shoe web having a slot formed therein and located at least as near said wheel cylinder as said anchor, and a single generally U-shaped spring combining the functions of shoe hold-down and shoe retraction springs;
said single spring having a center loop section and first and second spring arms extending from said center loop section, said center loop section being defined by a plurality of torsional spring loops connecting with said first and second spring arms, said spring arms curving toward said backing plate;
said anchor having a spring mounting and retaining post formed of tab-like portions extending substantially perpendicularly away from said backing plate and receiving said torsional spring loops thereabout in mounting relation and providing spring reaction for shoe hold-down;
said spring arms extending in curvilinear relation from said torsional loops in generally arcuate opposed directions and having outer arm portions in spring-engaging relation with said shoe webs, said spring arms further having hooked ends received in said shoe web slots in spring loaded relation, said spring being torsionally loaded in directions substantially parallel to said backing plate to urge said brake shoe assemblies toward the retracted position and cantilever spring loaded toward said backing plate to urge said brake shoe assemblies in resilient hold-down position against said backing plate.

2. For use in a drum brake assembly having a backing plate, a wheel cylinder mounted on said backing plate and an anchor also mounted on said backing plate circumferentially opposite said wheel cylinder, a pair of brake shoe assemblies having a first set of adjacent ends engaging said anchor and a second set of adjacent ends engaging said wheel cylinder for actuation, each of said brake shoe assemblies including a shoe web having a slot formed therein and located about midway between said wheel cylinder and said anchor:
said anchor having a spring mounting and retaining post formed of circumferentially segmented tab-like portions extending substantially perpendicularly away from said backing plate and receiving said torsional spring loops thereabout in mounting relation, said portions having spring retaining lips providing spring reaction for shoe hold-down,
and a single generally U-shaped spring combining the functions of shoe hold-down and shoe retracting springs, said single spring having a center loop section and first and second spring arms extending from said center loop section, said center loop section having a plurality of torsional spring loops connecting with said first and second spring arms with said spring arms being adapted to extend toward said backing plate to provide spring reaction for shoe hold-down, said torsional spring loops being adapted to be in abutting spring force engaging relation with said anchor spring retaining lips, said spring arms extending in curvilinear relation from said torsional spring loops in generally arcuate opposed directions and being adapted to have portions thereof in spring-engaging relation with said shoe webs, said spring arms further having hooked ends adapted to be received in said shoe web slots in spring loaded relation, said spring being adapted to be torsionally spring loaded as it is installed in the drum brake assembly to urge said brake shoe assemblies toward the retracted position and also cantilever spring loaded in resilient hold-down position against said backing plate when installed in the drum brake assembly.

* * * * *